US010345552B2

(12) United States Patent
Okuda (10) Patent No.: US 10,345,552 B2
(45) Date of Patent: Jul. 9, 2019

(54) LENS BARREL AND OPTICAL APPARATUS INCLUDING THE SAME

(71) Applicant: CANON KABUSHIKI KAISHA, Tokyo (JP)

(72) Inventor: Toshihiro Okuda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/563,005

(22) Filed: Dec. 8, 2014

(65) Prior Publication Data

US 2015/0160430 A1 Jun. 11, 2015

(30) Foreign Application Priority Data

Dec. 11, 2013 (JP) .................................. 2013-255781

(51) Int. Cl.
*G02B 7/10* (2006.01)
*G02B 7/105* (2006.01)
*G02B 15/16* (2006.01)

(52) U.S. Cl.
CPC .............. *G02B 7/105* (2013.01); *G02B 7/10* (2013.01); *G02B 7/102* (2013.01); *G02B 15/16* (2013.01); *G03B 2205/0046* (2013.01)

(58) Field of Classification Search
CPC . G02B 7/102; G02B 7/04; G02B 7/10; G02B 7/105; G03B 17/02; G03B 3/02; G03B 17/14
USPC ................................................ 359/695–700
See application file for complete search history.

(56) References Cited

U.S. PATENT DOCUMENTS

| 5,978,156 A | 11/1999 | Okada et al. | |
|---|---|---|---|
| 2005/0128603 A1* | 6/2005 | Tsuji | G02B 7/102 359/699 |
| 2005/0254144 A1* | 11/2005 | Sakamoto | G02B 7/021 359/700 |
| 2011/0050982 A1* | 3/2011 | Katsuyama | G02B 7/021 348/345 |

(Continued)

FOREIGN PATENT DOCUMENTS

| JP | H10039188 A | 2/1998 |
|---|---|---|
| JP | 3604823 B2 | 12/2004 |
| JP | 2006-054543 A | 2/2006 |

OTHER PUBLICATIONS

Office Action issued in Japanese Appln. No. 2013-255781 dated Apr. 3, 2018. English translation provided.

*Primary Examiner* — Darryl J Collins
*Assistant Examiner* — Journey F Sumlar
(74) *Attorney, Agent, or Firm* — Rossi, Kimms & McDowell LLP (57) ABSTRACT

A lens barrel 2 includes an optical system including a first lens unit held by a first holder and a second lens unit held by a second holder. The lens barrel 2 includes a first cam barrel 22 to be driven rotatably about an optical axis of the optical system in zooming, a second cam barrel 29 to be driven in an optical axis direction of the optical system in synchronization with the first cam barrel 22, and a third cam barrel 28 to be driven in the optical axis direction in synchronization with the first cam barrel 22 and driven rotatably about the optical axis in focusing. The second cam barrel 29 is provided with a first linear movement groove and a first cam groove. The third cam barrel 28 is provided with a second cam groove and a second linear movement groove.

17 Claims, 6 Drawing Sheets

(56) References Cited

U.S. PATENT DOCUMENTS

2013/0070345 A1* 3/2013 Kuryo .................... G02B 7/102
                                                    359/700
2013/0182326 A1* 7/2013 Shimane ................. G02B 7/10
                                                    359/557

* cited by examiner

FIG. 1

WIDE ANGLE AND INFINITE STATE

FIG. 2A

WIDE ANGLE AND SHORT DISTANCE STATE

FIG. 2B

TELEPHOTO AND INFINITE STATE

FIG. 3A

TELEPHOTO AND SHORT DISTANCE STATE

LENS BARREL AND OPTICAL APPARATUS INCLUDING THE SAME

BACKGROUND OF THE INVENTION

Field of the Invention

The present invention relates to a lens barrel and an optical apparatus including the same.

Description of the Related Art

In a so-called inner focus lens barrel (also referred to as a rear focus lens barrel), a change of a focal length in zooming causes a focal plane to move, which is called a focus variation. In order to reduce the focus variation, it is well known to provide a cam barrel driven in a magnification-varying operation (that is, in zooming) with a nonlinear focus cam that is used to continuously change a moving range of a focus lens unit from an infinite end to a short-distance end in an optical axis direction in accordance with the change of the focal length.

Japanese Patent Laid-open No. ("JP") 2006-54543 discloses a lens barrel including a plurality of cams rotatable about an optical axis in focusing so as to move a plurality of lens units in an optical axis direction. At least one of the cams is a range varying cam that changes the moving ranges of the lens units in accordance with a magnification state.

However, in the invention disclosed in JP 2006-54543, a first focus lens unit is held by a focusing cam barrel and a rotating barrel, and a second focus lens unit is held by the focusing cam barrel or a magnification-varying cam barrel, and the rotating barrel. In other words, a plurality of focus lens units are held by the rotating barrel with two different components. Any position shift between the two different components changes positions of the focus units, resulting in low accuracy of holding the focus units in some cases.

SUMMARY OF THE INVENTION

The present invention provides a lens barrel capable of preventing a movement of a focal plane in zooming and of holding a plurality of focus units with high accuracy, and an optical apparatus including the lens barrel.

A lens barrel according to an aspect of the present invention includes an optical system including a first lens unit held by a first holder and a second lens unit held by a second holder. The lens barrel includes a first cam barrel to be driven rotatably about an optical axis of the optical system in zooming, a second cam barrel to be driven in an optical axis direction of the optical system in synchronization with the first cam barrel, and a third cam barrel to be driven in the optical axis direction in synchronization with the first cam barrel and driven rotatably about the optical axis in focusing. The second cam barrel is provided with a first linear movement groove engaged with one of the first holder and the second holder and is provided with a first cam groove engaged with the other of the first holder and the second holder. The third cam barrel is provided with a second cam groove engaged with the one of the first holder and the second holder and is provided with a second linear movement groove engaged with the other of the first holder and the second holder.

Further features and aspects of the present invention will become apparent from the following description of exemplary embodiments with reference to the attached drawings.

DESCRIPTION OF THE EMBODIMENTS

Exemplary embodiments of the present invention will be described with reference to the accompanying drawings.

[Embodiment 1]

Figure 1:
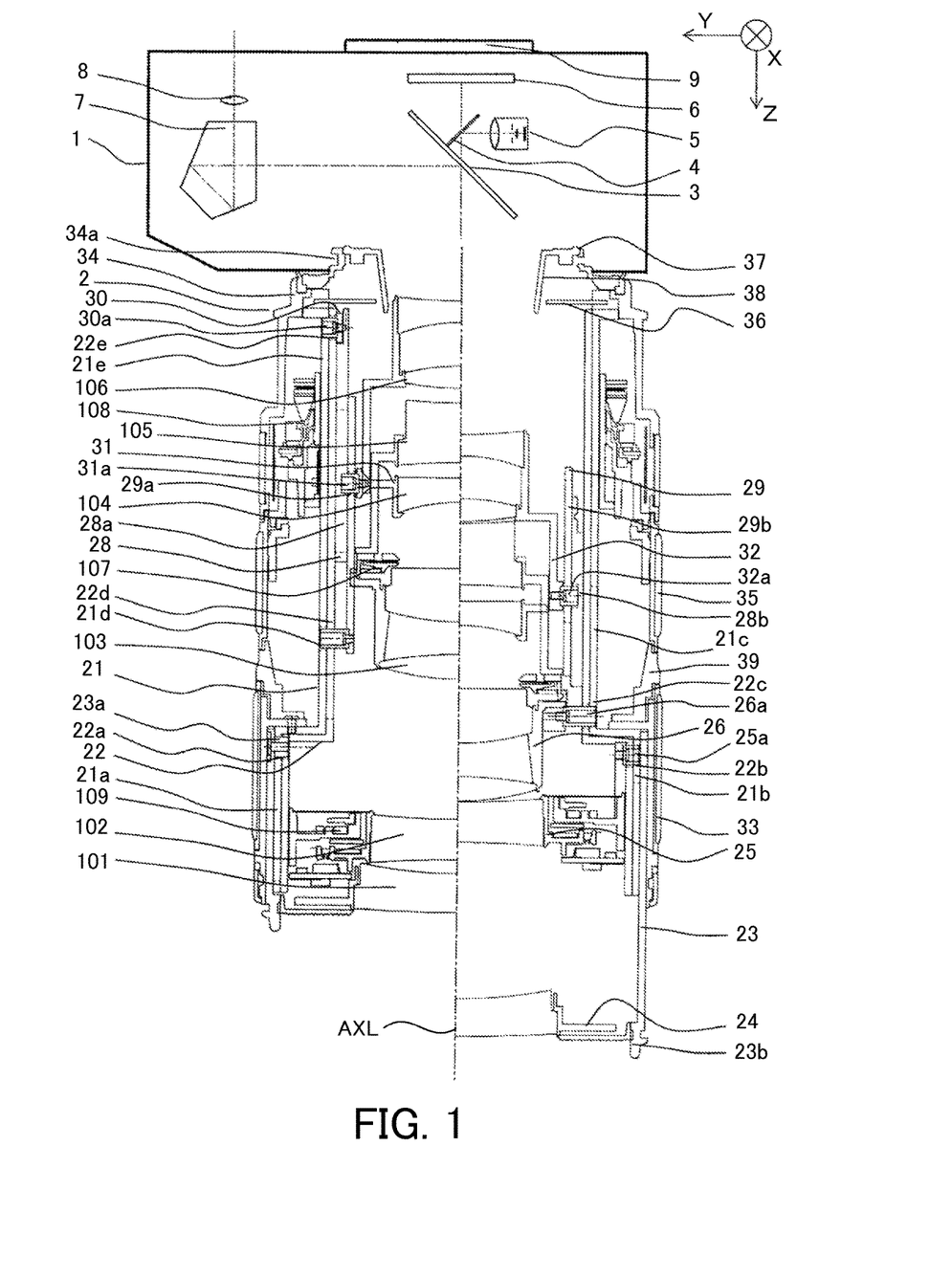
FIG. 1 is a sectional view of a camera system according to Embodiment 1 of the present invention.

FIG. 1 is a sectional view of a camera system (optical apparatus) including a zoom lens barrel (interchangeable lens) and a lens interchangeable digital single-lens reflex camera (image pickup apparatus) according to Embodiment 1 of the present invention. A wide angle state is illustrated above a centerline, and a telephoto state is illustrated under the centerline.

In FIG. 1, a direction of an optical axis AXL of an image-pickup optical system is defined as a Z direction, a lateral direction of two directions orthogonal to the optical axis AXL and parallel to an imaging plane of an image sensor 6 is defined as an X direction, and a longitudinal direction thereof is defined as a Y direction.

Reference numeral 1 denotes a camera body (hereinafter, simply referred to as the "camera"). Reference numeral 2 denotes the interchangeable lens detachably mounted on the camera 1. The camera 1 is not limited to a single-lens reflex camera such as a mirrorless camera.

Next follows a description of a structure of the camera 1. In a state illustrated in FIG. 1, a main mirror 3 is disposed on an optical path of a light flux from the interchangeable lens 2, and reflects part of the light flux to a finder optical system (7, 8) and transmits the rest of the light flux.

A sub mirror 4 is disposed behind (on an image side of) the main mirror 3 and reflects the light flux transmitted through the main mirror 3 to a focus detection unit 5. The main mirror 3 and the sub mirror 4 are integrally retractable from the optical path by a drive mechanism (not illustrated). The focus detection unit 5 provides a focus detection (a detection of a focus state of the interchangeable lens 2) by the well-known phase difference detection method.

Reference numeral 6 denotes the image sensor including a CCD sensor or a CMOS sensor, and an object image is formed on a light-receiving surface (the imaging plane) of the image sensor 6 by the light flux from the interchangeable lens 2. The image sensor 6 photoelectrically converts a formed object image (an optical image of an object formed through the image-pickup optical system) and outputs an image signal. Reference numeral 9 denotes a display panel configured to display an image output from a signal processor (not illustrated) that has received the signal from the image sensor 6 and other various kinds of image pickup information.

The interchangeable lens 2 houses the image-pickup optical system that forms the optical image of the object. The image-pickup optical system (hereinafter, also abbreviated to the "optical system") includes, in order from the object side to the image side, lens units 101, 102, 103, 104, 105, and 106, and a diaphragm unit 107. The interchangeable lens 2 can move a focus lens unit and a magnification-varying lens unit through movements of a zoom (magnification-varying) cam barrel (first cam barrel) 22, a first focus barrel (third cam barrel) 28, and a second focus barrel (second cam barrel) 29 relative to a guiding barrel 21 as described later.

The lens units (third lens units) 101, 103, and 105 constitute a magnification-varying lens unit (zoom lens unit) configured to be moved in the optical axis direction when the first cam barrel 22 is rotated by a zooming ring 33 about the optical axis of the optical system so as to change a focal length.

The lens unit (a second lens unit) 104 and the lens unit (a first lens unit) 106 each includes a magnification-varying focus lens configured to provide a magnification variation and focusing by moving in the optical axis direction when the drive power is supplied from a focus unit 108. As described above, the interchangeable lens 2 includes a plurality of lens units as magnification-varying and focusing lenses. The interchangeable lens 2 moves the lens units independently in the optical axis direction for focusing, and also moves these lens units independently in the optical axis direction in a magnification variation so as to prevent a movement (focus variation) of a focal plane caused by the magnification variation. The number of the lens units is not limited to two as in this embodiment and may be three or more.

The lens unit 102 includes an image stabilization lens unit configured to move in a direction vertical to the optical axis when the drive power is supplied from an image stabilizing unit 109 for the image stabization. The diaphragm unit 107 is disposed closer to the object than the third lens unit (third lens unit) 103 and adjusts a light quantity of the light flux incident on the camera 1.

Reference numeral 21 denotes the guiding barrel fixed on an exterior ring 34 described later, and the guiding barrel 21 holds, on its inner periphery, the first cam barrel 22 rotatable about the optical axis relative to the guiding barrel 21. The guiding barrel 21 is provided with a first lens unit linear movement groove (fifth linear movement groove) 21a, a second lens unit linear movement groove 21b, a third lens unit linear movement groove 21c, a cam groove (third cam groove) 21d, and a linear movement groove (fourth linear movement groove) 21e. The third cam groove 21d is a cam groove engaged with (a cam follower 29c attached to) the second cam barrel 29. The fourth linear movement groove 21e is a linear movement groove for linearly moving a moving barrel 30.

The exterior ring 34 is fastened to the guiding barrel 21 by, for example, a screw, and has a rear mount portion provided with a bayonet click 34a that connects to the camera 1. Reference numeral 38 denotes a back cover that is fixed on the exterior ring 34 by elasticity of a click (not illustrated).

The first cam barrel 22 is provided with a first lens unit cam groove (fifth cam groove) 22a, a second lens unit cam groove 22b, a third lens unit cam groove 22c, a linear movement groove (third linear movement groove) 22d, and a cam groove (fourth cam groove) 22e. The first cam barrel 22 is rotationally driven about the optical axis in the magnification-varying operation (that is, in zooming). The third linear movement groove 22d is engaged with (the cam follower 29c attached to) the second cam barrel 29. The second cam barrel 29 is thus held at a position where the third linear movement groove 22d of the first cam barrel 22 intersects with the third cam groove 21d of the guiding barrel 21. The fourth cam groove 22e is a cam groove for linearly moving the moving barrel 30. The moving barrel 30 is thus held at a position where the fourth cam groove 22e of the first cam barrel 22 intersects with the fourth linear movement groove 21e of the guiding barrel 21.

Reference numeral 23 denotes a linear movement barrel including a first lens unit holder (third holder) 24 attached to its inner periphery, the first lens unit holder 24 being attached to an outer periphery of the guiding barrel 21 movably in the optical axis direction and holding the third lens unit 101. The linear movement barrel 23 includes a cam follower 23a fastened by, for example, a screw to a rear portion of an inner periphery of the linear movement barrel 23, and the cam follower 23a is engaged with the fifth linear movement groove 21a and the fifth cam groove 22a formed in the guiding barrel 21. The linear movement barrel 23 includes a screw portion 23b at its front portion, to which an accessory such as a filter is attachable.

Reference numeral 25 denotes a second lens unit holder holding the lens unit 102 and provided with a cam follower 25a that is attached to an outer periphery of the second lens unit barrel and engaged with the second lens unit linear movement groove 21b and the second lens unit cam groove 22b. The second lens unit holder 25 is part of the image stabilizing unit 109, and the lens unit 102 is moved in a plane to vertical the optical axis.

Reference numeral 26 denotes a third lens unit holder (third holder) holding the third lens unit 103 and provided with a cam follower 26a attached to an outer periphery of the third lens unit holder. Reference numeral 27 denotes a fifth lens unit holder (third holder) holding the fifth lens unit (third lens unit) 105, fastened to the third lens unit holder (third holder) 26 by, for example, a screw, and configured to move integrally with the third lens unit holder (third holder) 26. The cam follower 26a is engaged with the third lens unit cam groove 22c provided to the first cam barrel 22 and the third lens unit linear movement groove 21c of the guiding barrel 21. The diaphragm unit 107, which is a well-known electromagnetic diaphragm unit, is attached to the third lens unit holder (third holder) 26 and is configured to move integrally therewith.

The third cam barrel 28 is rotatable about the optical axis through a focus key (not illustrated) that is an output portion of the focus unit 108 in a focusing operation (that is, in focusing). The third cam barrel 28 moves the second lens unit 104 and the first lens unit 106 in the optical axis direction for focusing.

The third cam barrel 28 is provided with a linear movement groove (second linear movement groove) 28a engaged with a cam follower 31a of a fourth lens unit holder (second holder) 31 and a focus cam (second cam groove) 28b engaged with a cam follower 32a of a sixth lens unit holder (first holder) 32. The third cam barrel 28 is held rotatably about the optical axis relative to the moving barrel 30. The second linear movement groove 28a extends in the optical axis direction.

The second cam barrel 29 is provided with a focus cam (first cam groove) 29a engaged with the cam follower 31a of the second holer 31 and a linear movement groove (first linear movement groove) 29b engaged with the cam follower 32a of the first holder 32. The cam follower 29c, which is provided to an outer periphery of the second cam barrel 29, is engaged with the third cam groove 21d and the third linear movement groove 22d. The first linear movement groove 29b extends in the optical axis direction.

Reference numeral 30 denotes the moving barrel provided with a cam follower 30a on its outer periphery that is engaged with the fourth linear movement groove 21e and the fourth cam groove 22e. The moving barrel 30 holds the third cam barrel 28 rotatably about the optical axis relative thereto and moves in the optical axis direction in the magnification-varying operation, as described later.

The second holder 31 is a holder holding the second lens unit 104. The cam follower 31a provided to an outer periphery of the second holer 31 is engaged with the second linear movement groove 28a provided to the third cam barrel 28 and the first cam groove 29a provided to the second cam barrel 29.

The first holder 32 is a holder holding the first lens unit 106. The cam follower 32a provided to an outer periphery of the first holder 32 is engaged with the focus cam (second cam groove) 28b provided to the third cam barrel 28 and the first linear movement groove 29b provided to the second cam barrel 29.

The second cam groove 28b and the first cam groove 29a change moving ranges of the second lens unit 104 and the first lens unit 106 in accordance with a magnification state (or a zoom state). This embodiment employs an inner focus lens barrel in which a lens closest to the object is not a focus lens, and includes a nonlinear cam groove provided to a cam barrel that is driven in the magnification-varying operation in order to prevent focus variation caused by the magnification-varying operation. This enables the moving ranges of the focus lens units from an infinite end to a short-distance end in the optical axis direction to continuously change in accordance with a change of the focal length.

The third cam barrel 28 and the second cam barrel 29 respectively include the second cam groove 28b and the first cam groove 29a. The prior art holds two focus lens units with three members (two cam barrels and a rotating barrel) and causes an inclination, decentering, and an image blur in focusing, but this embodiment holds the focus lens units with two members so as to reduce these defects. The third cam barrel 28 and the second cam barrel 29 hold a plurality of lens units (the second lens unit 104 and the first lens unit 106).

The first lens unit 106 is held at a position where the first linear movement groove 29b of the second cam barrel 29 intersects with the second cam groove 28b of the third cam barrel 28. The second lens unit 104 is held at a position where the first cam groove 29a of the second cam barrel 29 intersects with the second linear movement groove 28a of the third cam barrel 28. As described above, the first and second cam grooves 29a and 28b and the first and second linear movement grooves 29b and 28a are disposed in intersecting relations.

As described later, the second lens unit 104 moves in the optical axis direction without rotating in the magnification-varying operation, and moves in the optical axis direction in the focusing operation while rotating. The first lens unit 106 moves in the optical axis direction while rotating in the magnification-varying operation, and moves in the optical axis direction without rotating in the focusing operation.

Reference numeral 33 denotes the zooming ring, which is held rotatably about the optical axis relative to a front fixed barrel 39 fixed on the guiding barrel 21. The zooming ring 33 is coupled to the first cam barrel 22 through a zoom key (not illustrated) and transfers its rotation to the first cam barrel 22.

Reference numeral 35 denotes a focusing ring held rotatably relative to the focus unit 108. The focusing ring 35 includes a protruding portion (not illustrated) engaged with a groove of the focus unit 108, and transfers its rotation into the focus unit 108.

The focus unit 108 includes a well-known differential mechanism and can have its output key rotated by rotation through the focusing ring 35 or through drive source of the focus unit 108.

Reference numeral 36 denotes a circuit board mounted with wiring (not illustrated) for the electromagnetic diaphragm unit 107 and the focus unit 108, and a control unit (not illustrated) that controls these units.

Reference numeral 37 denotes a contact component for transferring a signal and supplying power between the camera body and the circuit board 36. The contact component 37 and the circuit board 36 are electrically connected to each other through a flexible printed board (not illustrated).

Figure 2A:
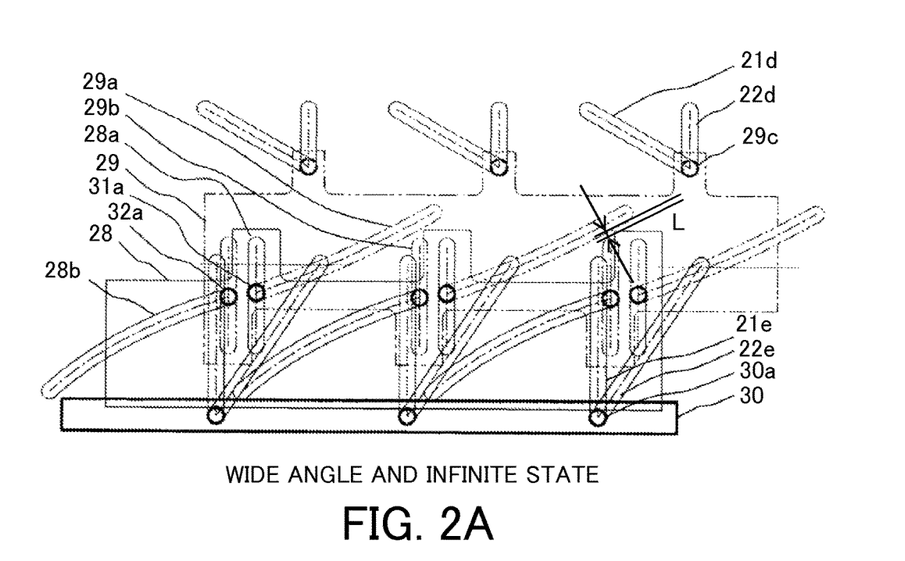
FIGS. 2A and 2B are enlarged views of components involved in focusing in a wide angle state of the camera system illustrated in FIG. 1 according to Embodiment 1.
Figure 2B:
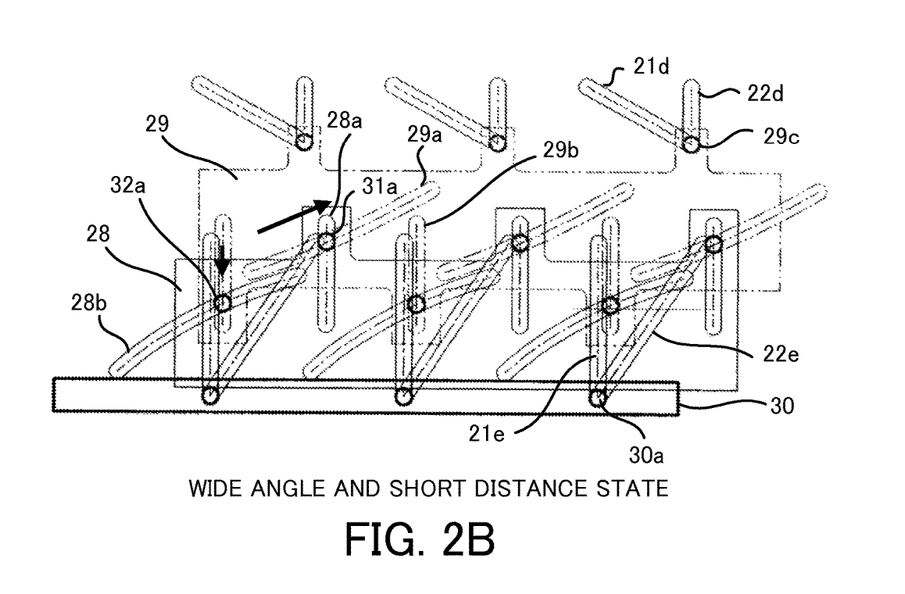
Figure 3A:
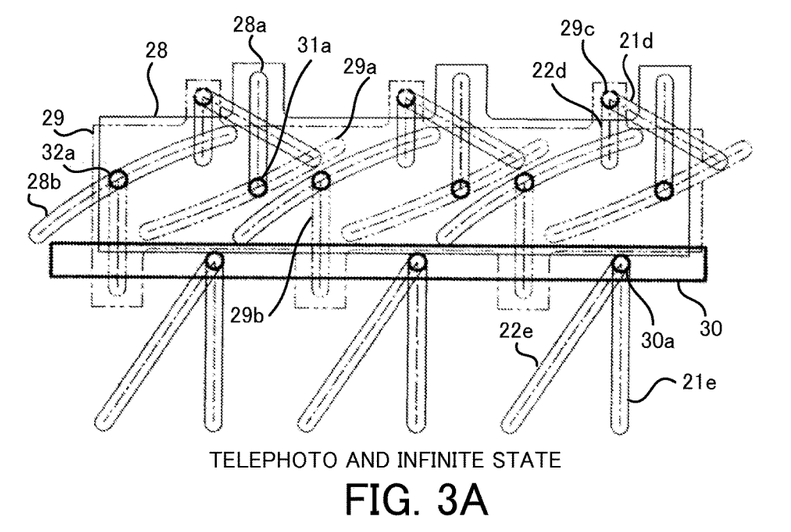
FIGS. 3A and 3B are enlarged views of components involved in focusing in a telephoto state of the camera system illustrated in FIG. 1 according to Embodiment 1.
Figure 3B:
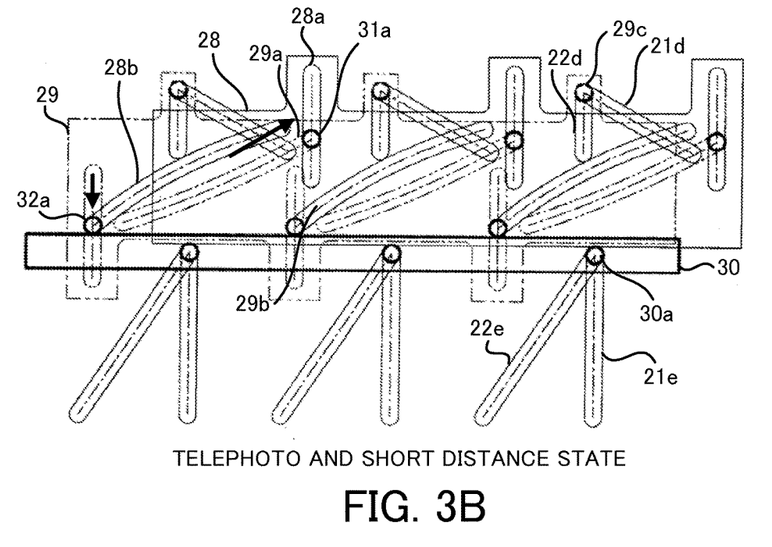

FIGS. 2A and 2B are developed views of the third cam barrel 28, the second cam barrel 29, the moving barrel 30, the second holer 31, and the first holder 32 in the wide angle state: FIG. 2A illustrates a case when the focal length is at an infinite position, and FIG. 2B illustrates a case when the focal length is at a shortest image-pickup distance. FIGS. 3A and 3B are developed views of these components in the telephoto state.

The lens barrel provides the magnification-varying operation through a rotation of the zooming ring 33, and provides the focusing operation through a rotation of the focusing ring 35. The focusing operation (focusing) can also be provided through drive of the focus unit 108.

Next follows a description of a zoom operation, that is, a change from the state illustrated in FIG. 2A to the state illustrated in FIG. 3A.

In the magnification-varying operation, the rotation of the zooming ring 33 rotates the first cam barrel 22. The rotation of the first cam barrel 22 engages the cam follower 23a with the fifth cam groove 22a and the fifth linear movement groove 21a, and moves the first lens unit barrel 24 in the optical axis direction. Similarly, the third lens unit holder 26 is moved in the optical axis direction through engagement of the cam follower with the cam groove of the first cam barrel 22 and the linear movement groove of the guiding barrel.

Figure 4:
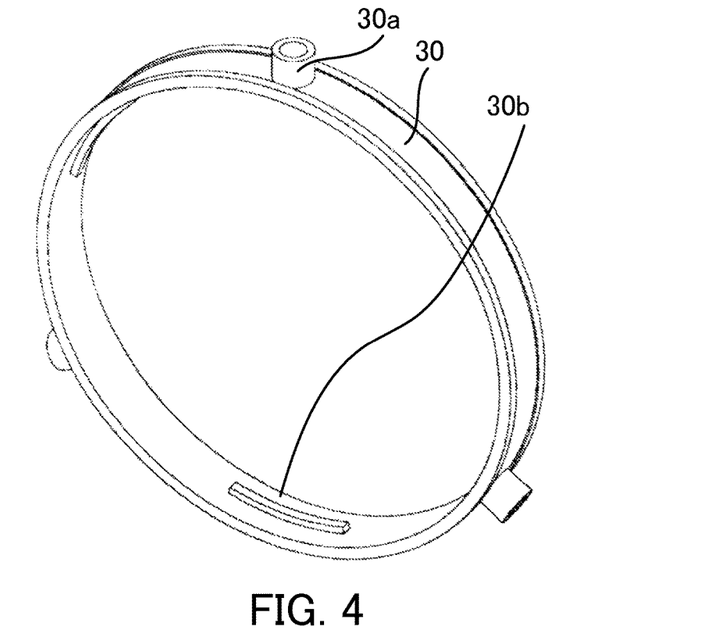
FIG. 4 is a perspective diagram of a moving barrel illustrated in FIG. 1 according to Embodiment 1.

FIG. 4 is a perspective diagram of the moving barrel 30. The moving barrel 30 is moved in the optical axis direction through the engagement of the cam follower 30a with the fourth cam groove 22e and the fourth linear movement groove 21e, and the third cam barrel 28 is moved in the optical axis direction accordingly. This is because the third cam barrel 28 is held rotatably about the optical axis relative to the moving barrel 30 through a groove (not illustrated) provided to the third cam barrel 28 and engaged with a protruding portion 30b that is provided on an inner periphery of the moving barrel 30. The third cam barrel 28 does not rotate because the focus key as the output portion of the focus unit 108 is engaged to prevent the rotation.

In synchronization with a rotation of the first cam barrel 22 about the optical axis, the second cam barrel 29 follows the third cam groove 21d and the third linear movement groove 22d with which the cam follower 29c is engaged, and moves in the optical axis direction of the optical system while rotating about the optical axis of the optical system.

During this movement, with respect to the cam follower 31a of the second holer 31 engaged with the second linear movement groove 28a and the first cam groove 29a, the third cam barrel 28 provided with the second linear movement groove 28a linearly moves without rotating, and the second cam barrel 29 provided with the first cam groove 29a moves in the optical axis direction while rotating about the optical axis of the optical system. In other words, since the first cam groove 29a changes its position of the engagement with the cam follower 31a while rotating, the second holer 31 linearly moves without rotating in the zoom operation.

On the other hand, with respect to the cam follower 32a of the first holder 32 engaged with the second cam groove 28b and the first linear movement groove 29b, the third cam barrel 28 provided with the second cam groove 28b linearly moves without rotating, and the second cam barrel 29 provided with the first linear movement groove 29b moves in the optical axis direction while rotating about the optical axis of the optical system. Thus, the cam follower 32a changes its position of the engagement with the second cam groove 28b while rotating along the first linear movement groove 29b. In other words, the first holder 32 moves in the optical axis direction while rotating in the zoom operation.

Next follows a description of the focus operation, that is, change from the state illustrated in FIG. 2A to the sate illustrated in FIG. 2B. Arrows illustrated in FIGS. 2A, 2B, 3A, and 3B represent movement of the cam followers 31a and 32b on the enlarged views in the focusing operation.

In the focusing operation, the focus key as the output portion of the focus unit 108 rotates about the optical axis, which rotationally drives the third cam barrel 28 about the optical axis. The third cam barrel 28 is rotated through the second linear movement groove 28a engaged with the cam follower 31a of the second holer 31. Meanwhile, the second cam barrel 29 is not rotated about the optical axis through the first cam groove 29a engaged with the cam follower 31a. In this manner, in the focusing operation, the second holer 31 moves in the optical axis direction while rotating. The third cam barrel 28 is rotated through the second cam groove 28b engaged with the cam follower 32a of the first holder 32, and meanwhile the second cam barrel 29 is not rotated through the first linear movement groove 29b engaged with the cam follower 32a. Thus, since the second cam groove 28b changes its position of the engagement with the cam follower 32a while rotating, the first holder 32 moves in the optical axis direction without rotating in the focusing operation.

In this manner, the positions of the engagement between the focus cams 29a and 28b and the cam followers 31a and 32a are shifted in the zoom operation so as to shift the range of the engagement with the first and second cam grooves 29a and 28b in accordance with the focal length.

As illustrated in FIGS. 2A, 2B, 3A, and 3B, the second and first cam grooves 28b and 29a are nonlinearly shaped such that their leads nonconstantly change so as to change a linear moving amount of the focus lens in accordance with the focal length. This change is represented as difference between the lengths of the arrows in the optical axis direction in FIGS. 2B and 3B.

Since the engagement positions are shifted in accordance with the focal length, the position of the infinite end for each focal length is shifted accordingly. This shift is corrected by changing the moving amounts of the first and second focus barrels 28 and 29, that is, by changing the loci of the third cam groove 21d and the fourth linear movement groove 21e.

In FIGS. 2A, 2B, 3A, and 3B, cam grooves other than the first and second cam grooves 29a and 28b have uniform leads, but are not limited thereto. If one of the first and second cam grooves 29a and 28b, which are nonlinearly shaped in this embodiment, has a uniform lead, the moving amount of one of the two focus lens units may be changed in accordance with the focal length. However, as described above, in order to prevent the focus variation caused by the zoom operation, it is advantageous to change the moving amounts of the two lens units in accordance with the focal length.

In this manner, the moving amounts of the two lens units in focusing are adjusted in accordance with a zoom position so as to prevent the focus variation depending on the zoom position for a zoom lens having a shortened image-pickup distance and a high-powered zoom lens having a wide range of the focal length.

The positions of the two focus lens units, which are the second lens unit 104 held by the second holer 31 and the first lens unit 106 held by the first holder 32, depend on a relation between the third cam barrel 28 and the second cam barrel 29, which enables the two focus lens units to be held with high accuracy.

Arranging the second holer 31 and the first holder 32 closely to each other is restricted by a distance L between the cam groove of the third cam barrel 28 and the linear movement groove of the second cam barrel 29. In the prior art, unless the two focus barrels have a difference in their diameters, their distance is restricted by a distance between the cam groove and end face of each of the two focus barrels and is almost twice the distance L. The present embodiment can achieve a closer distance between the focus lens units and thus achieve downsizing.

The prior art drives a plurality of focus units by using three different components long in the optical axis direction, whereas the moving barrel in this embodiment is short in the optical axis direction, which leads to a reduction of one component long in the optical axis direction and thus a cost reduction.

In this embodiment, the first holder 32 rotates in zooming and the second holer 31 rotates in focusing, but the present invention is not limited to this configuration and may have an opposite configuration in which the second holer 31 rotates in zooming and the first holder 32 rotates in focusing.

Figure 5:
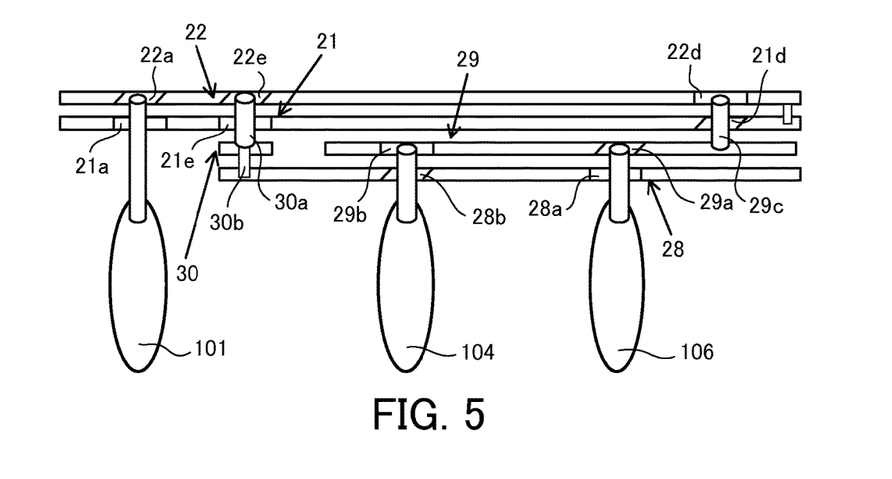
FIG. 5 is a schematic sectional view of a variation of Embodiment 1 illustrated in FIG. 1.

The present invention is not limited to an arrangement of the first and second cam grooves 29a and 28b and the first and second linear movement grooves 29b and 28a illustrated in FIGS. 2A, 2B, 3A, and 3B. FIG. 5 is a schematic sectional view of a variation of this embodiment. The schematic sectional view illustrates the lens barrel together with the optical axis and a principle of Embodiment 1. A focus cam (cam groove) is represented by a parallelogram and a linear movement groove is represented by a rectangle. The linear movement groove is formed extending linearly when the lens barrel is developed. A leftmost lens unit is the third lens unit 101 as an exemplary magnification-varying lens unit, but the magnification-varying lens unit may be the third lens unit (third lens unit) 103 or the fifth lens unit (third lens unit) 105. A middle lens unit is the second lens unit 104, and a rightmost lens unit is the first lens unit 106.

In FIG. 5, the second lens unit 104 is held at the position where the first linear movement groove 29b of the second cam barrel 29 intersects with the second cam groove 28b of the third cam barrel 28. The first lens unit 106 is held at the position where the first cam groove 29a of the second cam barrel 29 intersects with the second linear movement groove 28a of the third cam barrel 28. In this manner, in FIG. 5, the first and second cam grooves 29a and 28b and the first and second linear movement grooves 29b and 28a are disposed in the intersecting relations. However, in FIG. 5, the first lens unit 106 moves in the optical axis direction without rotating in the magnification-varying operation, and moves in the optical axis direction while rotating in the focusing operation. The second lens unit 104 moves in the optical axis direction while rotating in the magnification-varying operation, and moves in the optical axis direction without rotating in the focusing operation. This is opposite to the relation illustrated in FIGS. 3A, 3B, and 4. In other words, one of the second lens unit 104 and the first lens unit 106 is held at the position where the first linear movement groove 29b of the second cam barrel 29 intersects with the second cam groove 28b of the third cam barrel 28. The other of the second lens unit 104 and the first lens unit 106 is held at the position where the first cam groove 29a of the second cam barrel 29 intersects with the second linear movement groove 28a of the third cam barrel 28. The one of the second lens unit 104 and the first lens unit 106 moves in the optical axis direction without rotating in the magnification-varying operation, and moves in the optical axis direction while rotating in the focusing operation. The other of the second lens unit 104 and the first lens unit 106 moves in the optical axis direction while rotating in the magnification-varying operation, and moves in the optical axis direction without rotating in the focusing operation.

[Embodiment 2]

Figure 6:
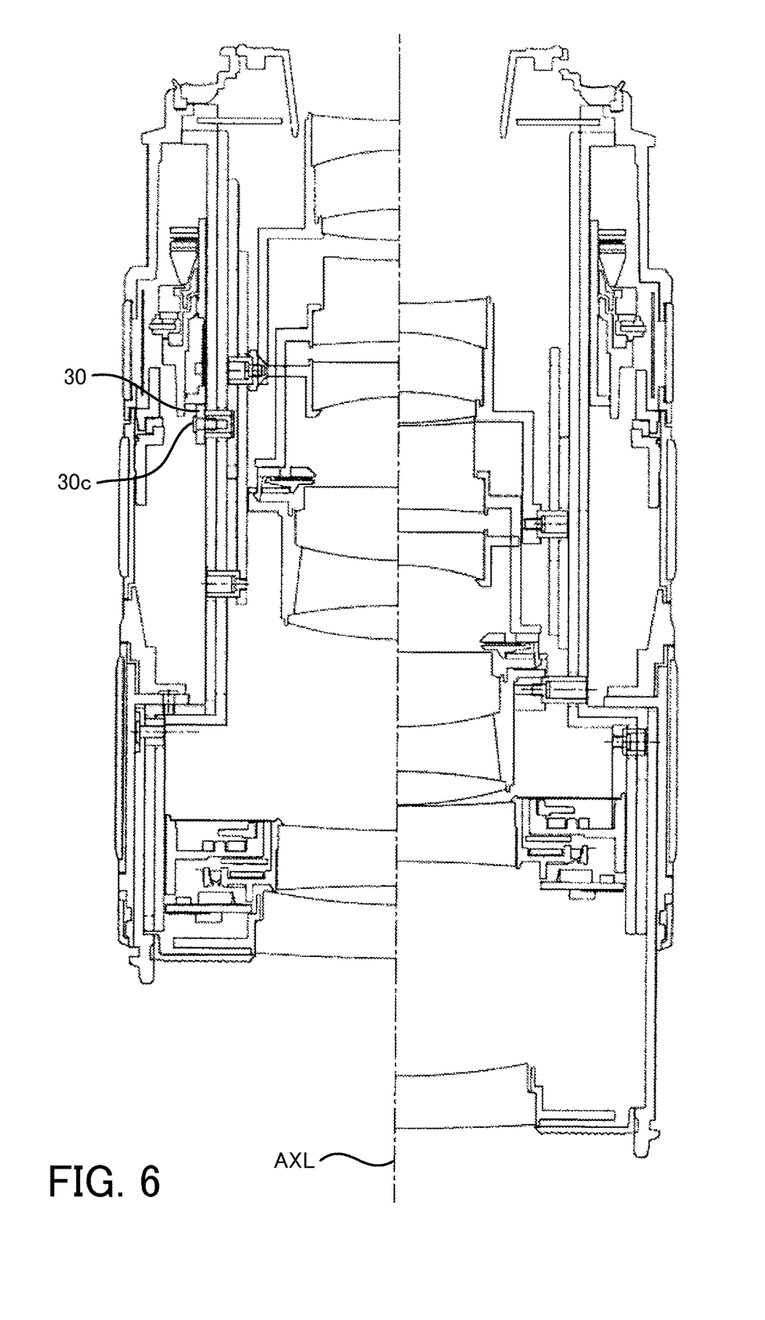
FIG. 6 is a sectional view of a camera system according to Embodiment 2 of the present invention.
Figure 7:
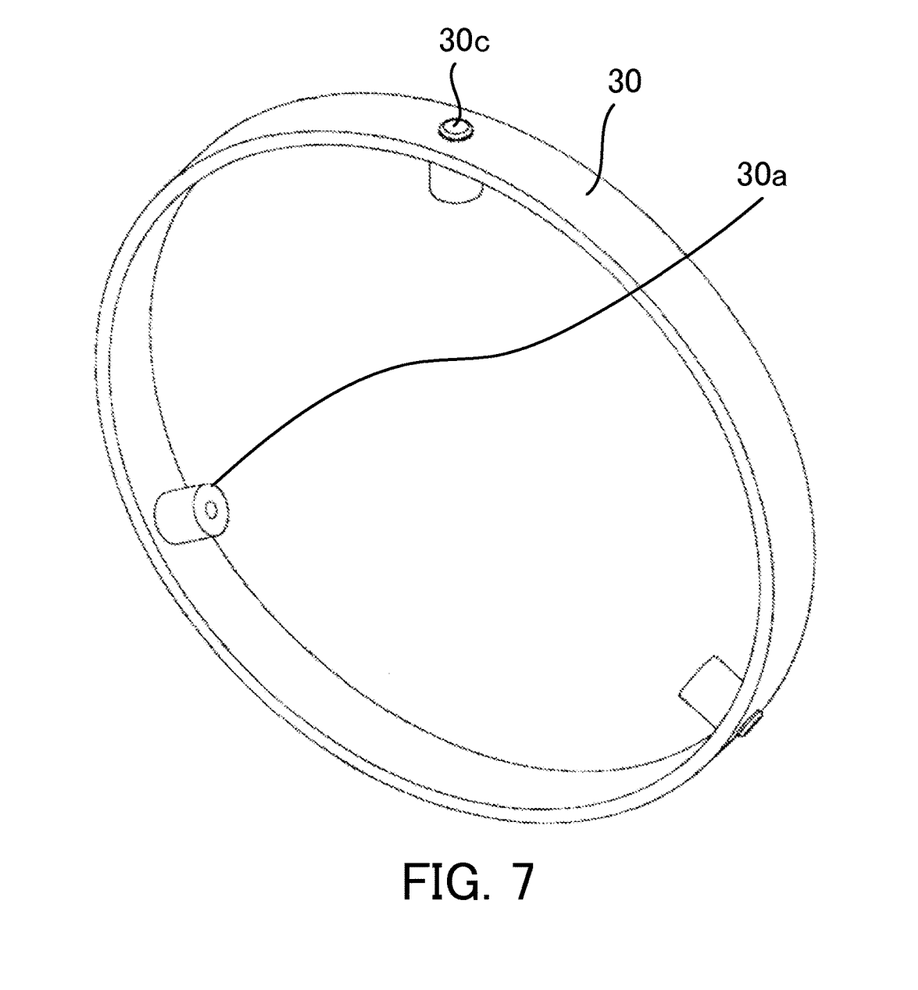
FIG. 7 is a perspective diagram of a moving barrel illustrated in FIG. 6 according to Embodiment 2.

Next follows a description of a zoom lens barrel according to Embodiment 2 with reference to FIGS. 6 and 7. In this embodiment, the moving barrel 30 has a configuration different from that in Embodiment 1. Specifically, the cam follower 30a is provided to the inner periphery of the moving barrel 30 instead of the outer periphery thereof, and is fixed, by a fasten member 30c, on the moving barrel 30 disposed on the outer periphery of the guiding barrel 21. The moving barrel 30 (or the cam follower 30a attached thereto) is engaged with the fourth linear movement groove 21e and the fourth cam groove 22e so as to linearly move the moving barrel 30, and is also engaged with the groove (not illustrated) of the third cam barrel 28 so as to rotatably hold the first focus barrel about the optical axis.

A comparison of the third cam barrel 28 between FIG. 1 and FIG. 6 shows that the third cam barrel 28 in FIG. 1 needs to be thick to allow the moving barrel 30 to engage with the groove (not illustrated) of the third cam barrel 28. In contrast, the third cam barrel 28 in this embodiment can be thin enough to allow only the cam follower 30a to engage with the groove (not illustrated) of the third cam barrel 28.

The configuration described above can thus contribute downsizing of a zoom lens having an enough space outside the guiding barrel 21 or not effectively using the space due to the component arrangement.

[Embodiment 3]

In this embodiment, the diaphragm unit 107 is attached to the first holder 32.

In the prior art, the diaphragm unit 107 moves in the optical axis direction while rotating, which makes wiring between the diaphragm unit 107 and the circuit board 36 complicated, prevents fast autofocusing, and degrades the durability.

In contrast, in this embodiment, at least one of the second holer 31 and the first holder 32 does not rotate in the focusing operation, which allows the diaphragm unit 107 to be attached thereto so as to resolve the complicated wiring. Although the diaphragm unit 107 still rotates in the magnification-varying operation, this configuration is advantageous in terms of the durability because the magnification-varying operation is typically slower than an autofocusing operation.

Each of the embodiments provides a lens barrel capable of preventing a movement of a focal plane in zooming and of holding a plurality of focus units with high accuracy, and also provides an optical apparatus including the lens barrel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-255781, filed on Dec. 11, 2013, which is hereby incorporated by reference herein in its entirety.

What is claimed is:

1. A lens barrel comprising:
an optical system that includes a first lens unit held by a first holder, a second lens unit held by a second holder and a third lens unit held by a third holder;
a zooming ring;
a focus unit;
a first cam barrel to be driven rotatably about an optical axis of the optical system in zooming by a rotation of the zooming ring;
a second cam barrel to be driven in an optical axis direction of the optical system in synchronization with the first cam barrel in the zooming;
a third cam barrel to be driven in the optical axis direction in synchronization with the first cam barrel in the zooming and driven rotatably about the optical axis in focusing by a drive of the focus unit; and
a guiding barrel,
wherein the first lens unit, the second lens unit, and the third lens unit move in the optical axis direction in the zooming,
wherein the second cam barrel is provided with a first linear movement groove engaged with one of the first holder and the second holder and is provided with a first cam groove engaged with the other of the first holder and the second holder,
wherein the third cam barrel is provided with a second cam groove engaged with the one of the first holder and the second holder and is provided with a second linear movement groove engaged with the other of the first holder and the second holder,
wherein the first and second lens units are held by first and second linear movement grooves and first and second cam grooves of the second and third cam barrels,
wherein the guiding barrel is provided with a fifth linear movement groove,
wherein the first cam barrel is provided with a fifth cam groove, and
wherein the third holder engages with the fifth cam groove and the fifth linear movement groove.

2. The lens barrel according to claim 1, wherein the one of the first lens unit and the second lens unit moves in the optical axis direction while rotating in the zooming and moves in the optical axis direction without rotating in the focusing, and
wherein the other of the first lens unit and the second lens unit moves in the optical axis direction without rotating in the zooming and moves in the optical axis direction while rotating in the focusing.

3. The lens barrel according to claim 2, further comprising a diaphragm unit fixed on the second holder and configured to adjust a light quantity.

4. The lens barrel according to claim 1, further comprising a moving barrel configured to hold the third cam barrel rotatably about the optical axis relative thereto and to move in the optical axis direction in the zooming.

5. The lens barrel according to claim 1, further comprising a guiding barrel provided with a third first cam groove and configured to hold the first cam barrel rotatably about the optical axis relative thereto,
wherein the first cam barrel is provided with a third linear movement groove, and wherein the second cam barrel is engaged with the third cam groove and the third linear movement groove.

6. The lens barrel according to claim 1, further comprising:
a moving barrel configured to hold the third cam barrel rotatably about the optical axis relative thereto and to move in the optical axis direction in the zooming; and
a guiding barrel provided with a fourth linear movement groove and configured to hold the first cam barrel rotatably about the optical axis relative thereto,
wherein the first cam barrel is provided with a fourth cam groove, and
wherein the moving barrel is engaged with the fourth cam groove and the fourth linear movement groove.

7. The lens barrel according to claim 6, wherein the moving barrel is disposed outside the first cam barrel and the guiding barrel.

8. The lens barrel according to claim 6, wherein the moving barrel is disposed inside the first cam barrel and the guiding barrel.

9. The lens barrel according to claim 1, wherein the first and second lens units are held by the first cam barrel through the second and third cam barrels.

10. The lens barrel according to claim 1, wherein the first lens unit and the second lens unit move in the optical axis direction in the focusing.

11. The lens barrel according to claim 10, wherein at least one of a first moving amount of the first lens unit in the focusing and a second moving amount of the second lens unit in the focusing changes in accordance with a focal length of the optical system.

12. The lens barrel according to claim 10, wherein the first lens unit and the second lens unit move in a different locus from each other in the focusing.

13. The lens barrel according to claim 10, wherein the first lens unit and the second lens unit move in a different direction from each other in the focusing.

14. The lens barrel according to claim 10, wherein at least one of the first cam groove and the second cam groove is nonlinearly shaped.

15. The lens barrel according to claim 10, wherein the first cam groove and the second cam groove are different from each other in shape.

16. The lens barrel according to claim 10, wherein a position where the first linear movement groove crosses the second cam groove and a position where the first cam groove crosses the second linear movement groove change in the zooming and the focusing.

17. An optical apparatus comprising:
a lens barrel; and
an image pickup apparatus to which the lens barrel is detachably attached,
wherein the lens barrel includes:
an optical system that includes a first lens unit held by a first holder and a second lens unit held by a second holder;
a zooming ring;
a focus unit;
a first cam barrel to be driven rotatably about an optical axis of the optical system in zooming by a rotation of the zooming ring;
a second cam barrel to be driven in an optical axis direction of the optical system in synchronization with the first cam barrel in the zooming;
a third cam barrel to be driven in the optical axis direction in synchronization with the first cam barrel in the zooming and driven rotatably about the optical axis in focusing by a drive of the focus unit; and
a guiding barrel,
wherein the first lens unit, the second lens unit, and the third lens unit move in the optical axis direction in the zooming,
wherein the second cam barrel is provided with a first cam groove engaged with a first holder and is provided with a first linear movement groove engaged with a second holder, and
wherein the third cam barrel is provided with a second linear movement groove engaged with the first holder and is provided with a second cam groove engaged with the second holder,
wherein the first and second lens units are held by first and second linear movement grooves and first and second cam grooves of the second and third cam barrels,
wherein the guiding barrel is provided with a fifth linear movement groove,
wherein the first cam barrel is provided with a fifth cam groove, and
wherein the third holder engages with the fifth cam groove and the fifth linear movement groove.

* * * * *